(12) United States Patent
Liu et al.

(10) Patent No.: US 11,149,873 B2
(45) Date of Patent: Oct. 19, 2021

(54) VALVE SYSTEM WITH ISOLATION DEVICE

(71) Applicant: JIANGSU RELIABLE MECHANICAL EQUIPMENT CO., LTD, Jiangsu (CN)

(72) Inventors: Hailiang Liu, Jiangsu (CN); Tao Mu, Jiangsu (CN); Shoujun Zhao, Jiangsu (CN); Zaixiao Zhang, Jiangsu (CN); Lei Wang, Jiangsu (CN)

(73) Assignee: JIANGSU RELIABLE MECHANICAL EQUIPMENT CO., LTD, Nanjing (CN)

( * ) Notice: Subject to any disclaimer, the term of this patent is extended or adjusted under 35 U.S.C. 154(b) by 0 days.

(21) Appl. No.: 16/529,947

(22) Filed: Aug. 2, 2019

(65) Prior Publication Data

US 2020/0041027 A1 Feb. 6, 2020

(51) Int. Cl.
*F16K 31/165* (2006.01)
*F16K 31/126* (2006.01)
(Continued)

(52) U.S. Cl.
CPC .......... *F16K 31/165* (2013.01); *F16K 17/085* (2013.01); *F16K 17/087* (2013.01);
(Continued)

(58) Field of Classification Search
CPC .... F16K 17/70; F16K 31/1635; F16K 31/165; F16K 17/085; F16K 17/406;
(Continued)

(56) References Cited

U.S. PATENT DOCUMENTS 1,934,548 A * 11/1933 Kellogg ................ F25B 41/043
137/505.13
1,975,656 A * 10/1934 Irvin ........................ F23N 1/00
236/80 R
(Continued)

FOREIGN PATENT DOCUMENTS

| CN | 2117514 | 9/1992 |
| CN | 203223605 | 10/2013 |
| CN | 104251324 | 12/2014 |

*Primary Examiner* — William M McCalister
(74) *Attorney, Agent, or Firm* — Rankin, Hill & Clark LLP

(57) ABSTRACT

An on/off valve controls circulation of mediums in an upstream pipeline and a downstream pipeline of the on/off valve; a valve stem of the on/off valve is connected with an on/off actuating mechanism; the upstream pipeline of the on/off valve is connected with a pilot trigger mechanism through a communicating pipe, the pilot trigger mechanism is connected with the on/off actuating mechanism, and the pilot trigger mechanism triggers the on/off actuating mechanism. An isolation device is arranged on the communicating pipe and isolates the communicating pipe into an upstream portion and a downstream portion through a pressure sensing component. The pressure sensing component senses a medium pressure from the upstream pipeline and feed back the pressure to the pilot trigger mechanism, thereby causing an action of the pilot trigger mechanism. A non-viscous and incompressible fluid is filled between the downstream of the communicating pipe and the pilot trigger mechanism.

6 Claims, 2 Drawing Sheets

(51) Int. Cl.
*F16K 31/528* (2006.01)
*F16K 17/08* (2006.01)

(52) U.S. Cl.
CPC ........ *F16K 31/126* (2013.01); *F16K 31/1266* (2013.01); *F16K 31/528* (2013.01); *Y10T 137/1677* (2015.04); *Y10T 137/86485* (2015.04)

(58) Field of Classification Search
CPC .. F16K 31/126; F16K 31/1266; F16K 31/528; Y10T 137/1669; Y10T 137/1677; Y10T 137/1782; Y10T 137/7796; Y10T 137/86486; Y10T 137/86485; G05D 16/025; G05D 16/026; G05D 16/0625; G05D 16/0627; G05D 16/0686
USPC ........... 137/68.16, 68.17, 70, 624.27, 505.13
See application file for complete search history.

(56) References Cited

U.S. PATENT DOCUMENTS

| | | | | |
|---|---|---|---|---|
| 2,314,218 A * | 3/1943 | Jimerson | ............. | B24B 55/00 91/435 |
| 3,074,435 A * | 1/1963 | Woestemeyer | .... | G05D 16/0619 92/35 |
| 3,208,467 A * | 9/1965 | Eichelman | ......... | G05D 16/0625 137/104 |
| 3,481,357 A * | 12/1969 | Scheflow | ........... | G05D 16/0625 137/116.5 |
| 3,589,481 A * | 6/1971 | Motsch | ................... | B60T 11/24 188/345 |
| 3,650,506 A * | 3/1972 | Bruton | ................... | F16K 17/32 251/26 |
| 4,109,512 A * | 8/1978 | Ledeen | ............... | G01M 3/2815 137/12 |
| 4,361,165 A * | 11/1982 | Flory | ..................... | F16K 17/40 137/614.02 |
| 4,724,857 A * | 2/1988 | Taylor | .................. | F16K 17/406 137/538 |
| 5,495,869 A * | 3/1996 | Hashida | .................. | B60T 8/365 137/504 |
| 5,975,128 A * | 11/1999 | Schatz | ..................... | F02D 9/06 123/323 |
| 6,367,498 B1 * | 4/2002 | Brazier | ................. | F16K 17/386 137/467 |
| 6,651,686 B2 * | 11/2003 | Scantlin | ................. | G05D 16/18 137/461 |
| 6,651,687 B2 * | 11/2003 | Taylor | .................... | F16K 17/40 137/467 |
| 6,666,230 B1 * | 12/2003 | Taylor | .................... | F16K 17/14 137/624.27 |
| 7,438,087 B1 * | 10/2008 | Taylor | .................... | F16K 15/03 137/624.27 |
| 8,549,924 B2 * | 10/2013 | Virtanen | ............. | E21B 33/0385 73/708 |
| 8,607,873 B2 * | 12/2013 | Aadnoy | ................. | E21B 34/08 166/320 |
| 2005/0056318 A1 * | 3/2005 | Arlinghaus, Jr. | .... | G05D 16/185 137/505.13 |
| 2010/0126601 A1 * | 5/2010 | Heron | ................. | G05D 16/202 137/488 |
| 2014/0090724 A1 * | 4/2014 | Mevius | ................. | F16K 17/042 137/488 |
| 2015/0107710 A1 * | 4/2015 | Huang | ................. | F16K 15/145 137/859 |
| 2017/0067576 A1 * | 3/2017 | Jing | ....................... | F16K 17/34 |
| 2017/0122448 A1 * | 5/2017 | Liu | ....................... | F16K 17/406 |

* cited by examiner

VALVE SYSTEM WITH ISOLATION DEVICE

TECHNICAL FIELD

The present invention belongs to the field of valve technologies, and more particularly, relates to a valve system with an isolation device.

BACKGROUND

In order to protect a pressure pipeline, a pressure vessel and their upstream and downstream devices and equipment, it is often necessary to arrange a valve that can automatically be opened or closed under an overpressure condition. In the past practice, a pressure transmitter is usually used to detect a pressure in the pressure pipeline or the pressure vessel, the pressure transmitter outputs a signal to a control system, and when the pressure exceeds a set value, the control system may automatically send an instruction to open or close the valve.

The main potential risk of using the pressure transmitter and the control system to realize automatic valve opening or closing under overpressure condition is that, if the pressure transmitter fails, or if there is a problem in signal transmission between the pressure transmitter and the control system, or if there is a problem in signal transmission between the control system and the valve, there may be a situation that the pressure has exceeded the set value, but the valve does not act as scheduled, thereby posing a threat to the pressure pipeline, the pressure vessel and their upstream and downstream devices and equipment.

In a low pressure situation requiring a higher pressure control accuracy, it is especially necessary to improve the sensitivity and reliability of triggering. In practice, a diaphragm pilot-type automatic valve based on triggering of compression bar buckling can be used. This type of automatic valve usually uses a communicating to communicate the pilot trigger mechanism with an upstream pipeline of the on-off valve. However, when fluid in the upstream pipeline is relatively viscous or easy to crystallize and solidify, the communicating pipe may often be blocked, thus affecting the sensitivity of the pilot trigger mechanism.

SUMMARY

In order to solve the technical problems above, the present invention is intended to provide a valve system with an isolation device, and the following technical solutions are adopted specifically.

A valve system with an isolation device comprises an on/off valve mounted on a pipeline, wherein the on/off valve controls circulation of mediums in an upstream pipeline of the on/off valve and a downstream pipeline of the on/off valve; a valve stem of the on/off valve is connected with an on/off actuating mechanism; the upstream pipeline of the on/off valve is connected with a pilot trigger mechanism through a communicating pipe, the pilot trigger mechanism is connected with the on/off actuating mechanism, the pilot trigger mechanism is adapted for triggering the on/off actuating mechanism; wherein an isolation device is arranged on the communicating pipe, the isolation device isolates the communicating pipe into an upstream portion and a downstream portion through a pressure sensing component, the pressure sensing component of the isolation device can sense a medium pressure from the upstream pipeline and feed back the pressure to the pilot trigger mechanism, thereby causing an action of the pilot trigger mechanism, and a non-viscous and incompressible fluid is filled between a downstream of the communicating pipe and the pilot trigger mechanism.

The isolation device comprises a housing and a corrugated pipe, the pressure sensing component is the corrugated pipe, one side of the corrugated pipe is contacted with the medium of the upstream pipeline, and the other side of the corrugated pipe is contacted with the fluid filled between the communicating pipe and the pilot trigger mechanism.

The isolation device is an isolation device with a diaphragm structure, a housing thereof is composed of a housing A of the isolation device and a housing B of the isolation device, the pressure sensing component is a diaphragm B fixed between the housing A and the housing B, one side of the diaphragm B facing the downstream of the communicating pipe is connected with a diaphragm supporting plate, and the other end of the diaphragm supporting plate is connected with a piston rod.

The isolation device is an isolation device with a piston structure and comprises a housing, the pressure sensing component is a piston arranged in the housing, one side of the piston facing the downstream of the communicating pipe is provided with a piston rod, and the piston rod is equipped with a guide sleeve to match therewith.

The on/off actuating mechanism comprises a cylinder, a push rod is slidably mounted in the cylinder, an actuating piston is connected with an upper end of the push rod, a compression spring is arranged between the actuating piston and the cylinder, a shifting fork connected with the valve stem is hinged in a middle portion of the push rod, a lower end of the push rod extends out of the cylinder, and when moving linearly, the push rod drives the shifting fork to further change a valve position state of the on/off valve; and a lower end of the cylinder is hinged with two oppositely arranged locking rockers, when the on/off valve is in a normal valve position, the two locking rockers are in a closed state and a lower end of the push rod is contacted with the two locking rockers, and free ends of the two locking rockers are limited in a locking neck.

The pilot trigger mechanism comprises a pilot valve body, the pilot valve body is divided into a first chamber and a second chamber by a diaphragm A, the first chamber is communicated with the downstream of the communicating pipe, an ejector rod connected with the diaphragm A is slidably mounted in the pilot valve body, an upper end of the ejector rod extends out of the pilot valve body and is connected with the on/off actuating mechanism, and a lower end of the ejector rod extends out of the pilot valve body and is connected with a trigger rod.

A protective cover is arranged outside the trigger rod, and the trigger rod is detachably connected with the protective cover through a nut.

An upper end of the ejector rod extends out of the pilot valve body and is connected with a locking neck adapted for limiting the action of the on/off actuating mechanism.

A supporting plate is arranged between the ejector rod and the diaphragm A.

By using the technical solution above, the present invention at least has the following beneficial effects.

The present invention can be used in an occasion where a pipeline medium is an easily crystallize and condensed fluid through arranging an isolation structure, and improve the valve response accuracy and sensitivity. Meanwhile, the diaphragm-type pilot structure is used in the present invention, when the pressure exceeds the set value, the action response is fast and the response is sensitive, which is especially suitable for the low pressure occasion of high pressure control precision requirement, with good trigger sensitivity and reliability.

Figure 1:
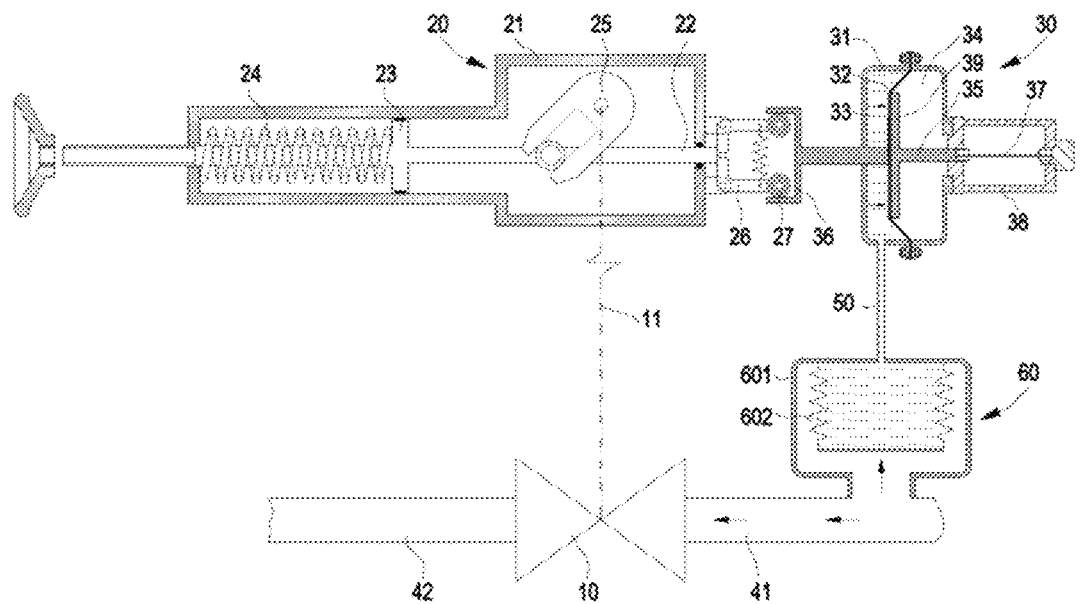
FIG. 1 is a structure diagram of the present invention.

Reference numerals are illustrated as follows:

10 refers to on/off valve, 11 refers to valve stem, and 20 refers to on/off actuating mechanism;

21 refers to cylinder, 22 refers to push rod, and 23 refers to actuating piston;

24 refers to compression spring, 25 refers to shifting fork, and 26 refers to locking rocker;

27 refers to bearing, 30 refers to pilot trigger mechanism, and 31 refers to pilot valve body;

32 refers to diaphragm A, 33 refers to first chamber, 34 refers to second chamber, and 35 refers to ejector rod; 36 locking neck 37 refers to trigger rod, 38 refers to protective cover, and 39 refers to supporting plate;

41 refers to upstream pipeline, 42 refers to downstream pipeline, 50 refers to communicating pipe, and 60 refers to isolation device;

601 refers to housing, 602 refers to corrugated pipe, and 61 refers to isolation device with a diaphragm structure;

611 refers to diaphragm B, 612 refers to housing A of isolation device, and 613 refers to housing B of isolation device;

614 refers to guide sleeve, 615 refers to piston rod, and 616 refers to diaphragm supporting plate;

62 refers to isolation device with a piston structure, 621 refers to housing of isolation device, and 622 refers to piston;

623 refers to guide sleeve, 624 refers to piston rod, and 63 refers to a reverse isolation device; and 631 refers to housing of reverse isolation device, and 632 refers to corrugated pipe.

DETAILED DESCRIPTION

The present invention is further described hereinafter with reference to the drawings and the embodiments. In the following detailed description, certain exemplary embodiments of the present invention are described by way of illustration only. There is no doubt that those of ordinary skills in the art can recognize that the described embodiments can be modified in various different ways without departing from the spirit and scope of the present invention. Therefore, the drawings and description are illustrative in nature and are not intended to limit the protection scope of the claims.

As shown in FIG. 1, a valve system with an isolation device comprises an on/off valve 10 mounted on a pipeline, wherein the on/off valve 10 controls circulation of mediums in an upstream pipeline 41 of the on/off valve and a downstream pipeline 42 of the on/off valve; a valve stem 11 of the on/off valve 10 is connected with an on/off actuating mechanism 20; the upstream pipeline 41 of the on/off valve is connected with a pilot trigger mechanism 30 through a communicating pipe 50, and the pilot trigger mechanism 30 is connected with the on/off actuating mechanism 20 and is adapted for triggering the on/off actuating mechanism.

An isolation device is arranged on the communicating pipe 50, the isolation device isolates the communicating pipe 50 into an upstream portion and a downstream portion through a pressure sensing component, the pressure sensing component of the isolation device can sense a medium pressure from the upstream pipeline 41 and feed back the pressure to the pilot trigger mechanism 30, thereby causing an action of the pilot trigger mechanism, and non-viscous and incompressible fluid, such as low viscosity hydraulic oil, etc., is filled between a downstream of the communicating pipe 50 and the pilot trigger mechanism 30. The isolation device may be made of metal.

As shown in FIG. 1, the isolation device 60 of the present invention comprises a housing 601 and a corrugated pipe 602, the pressure sensing component is the corrugated pipe 602, the corrugated pipe 602 is flexible, one side of the corrugated pipe is contacted with the medium of the upstream pipeline 41, the other side of the corrugated pipe is contacted with the fluid filled between the communicating pipe 50 and the pilot trigger mechanism 30, when the medium pressure of the upstream pipeline 41 is too high, the corrugated pipe contracts, thus squeezing the fluid between the communicating pipe 50 and the pilot trigger mechanism, and the increase in the pressure of the fluid may cause the action of the pilot trigger mechanism 30, thus driving the on/off actuating mechanism 20 to control the opening or closing of the on/off valve 10.

Figure 4:
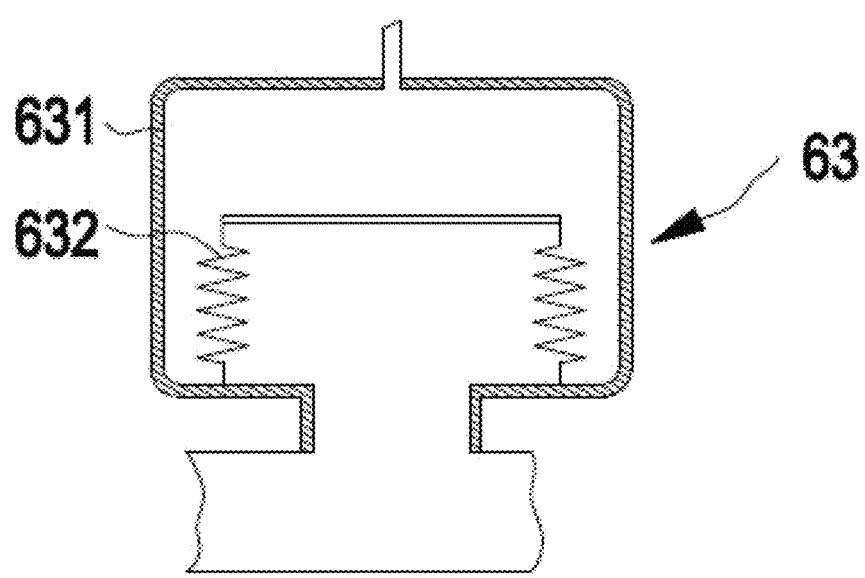
FIG. 4 is a diagram of a reverse isolation device.

The corrugated pipe above can be arranged in the direction that the isolation device is close to a downstream part of the communicating pipe or in the direction that the isolation device is close to an upstream part of the communicating pipe, as shown in FIG. 4, and at the moment, the isolation device can be referred to as a reverse isolation device 63, which also comprises a housing 631 of the reverse isolation device and a corrugated pipe 632.

Figure 2:
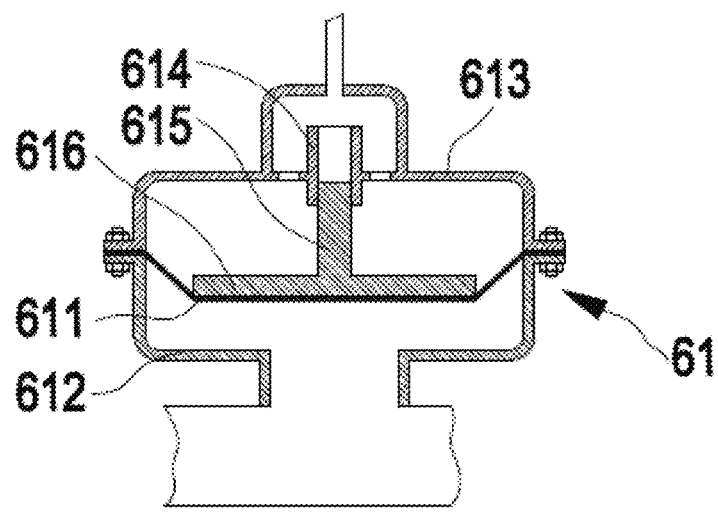
FIG. 2 is a diagram of an isolation device with a diaphragm structure.

An isolation device 61 with a diaphragm structure shown in FIG. 2 may further be used as the isolation device of the present invention, the housing thereof is composed of a housing A 612 of the isolation device and a housing B 613 of the isolation device, a diaphragm B 611 is fixed between the housing A and the housing B, the pressure sensing component is the diaphragm B 611, one side of the diaphragm B facing the downstream of the communicating pipe 50 is connected with a diaphragm supporting plate 616, the other end of the diaphragm supporting plate 616 is connected with a piston rod 615, and the diaphragm B 611 moves to the downstream of the communicating pipe 50 under pressure, thus driving the diaphragm supporting plate 616 and the piston rod 615 to apply pressure to the pilot trigger mechanism 30.

Figure 3:
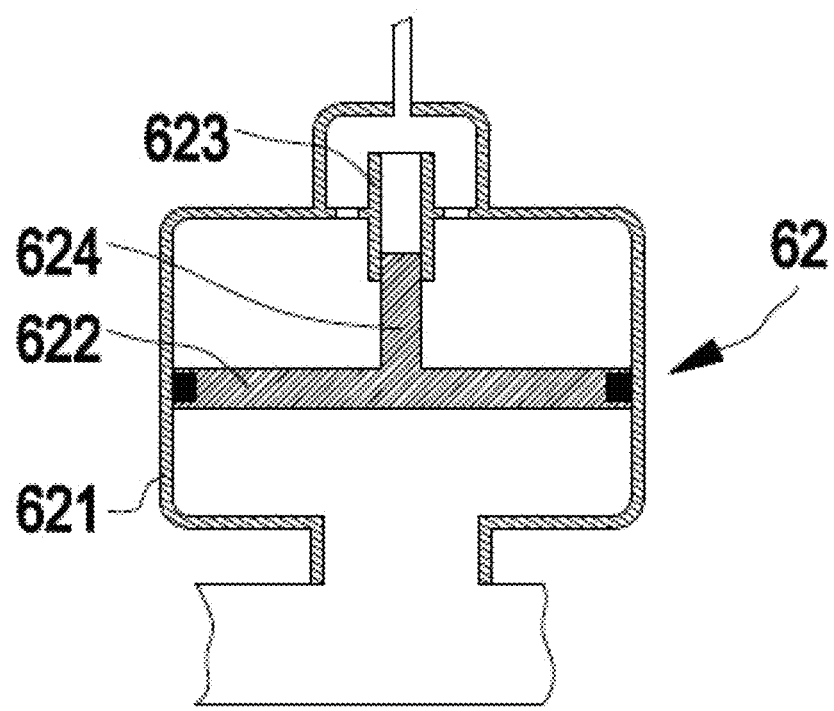
FIG. 3 is a diagram of an isolation device with a piston structure.

As an alternative form, an isolation device 62 with a piston structure shown in FIG. 3 may further be used as the isolation device, which comprises a housing 621 of the isolation device, a piston 622 is arranged in the housing 621 of the isolation device, the pressure sensing component is the piston 622, one side of the piston facing the downstream of the communicating pipe 50 is provided with a piston rod 624, the piston rod 624 is equipped with a guide sleeve 623 to match therewith, and the piston 622 moves to the downstream of the communicating pipe 50 under pressure, thus driving the piston rod 624 to apply pressure to the pilot trigger mechanism 30.

The pilot trigger mechanism 30 comprises a pilot valve body 31, the pilot valve body 31 is divided into a first chamber 33 and a second chamber 34 by a diaphragm 32, the first chamber 33 is communicated with the downstream of the communicating pipe 50, an ejector rod 35 connected with the diaphragm A 32 is slidably mounted in the pilot valve body 31, and a supporting plate 39 is arranged between the ejector rod 35 and the diaphragm A 32; and an upper end of the ejector rod 35 extends out of the pilot valve body 31 and is connected with a locking neck 36 adapted for limiting an action of the on/off actuating mechanism 20, and a lower end of the ejector rod 35 extends out of the pilot valve body 31 and is connected with a trigger rod 37.

The pilot trigger mechanism 30 is designed based on the principle of compression bar stability and compression bar instability, and has two working positions. It is the trigger rod 37 that determines the working position of the mechanism, so as to determine whether the entire automatic valve is operated, a protective cover 38 is arranged outside the trigger rod 37, and the trigger rod 37 is detachably connected with the protective cover 38 through a nut. When a pressure in the first chamber 33 exceeds a set value, the medium pressure is rapidly transmitted through the diaphragm 32, thus causing instable buckling of the trigger rod 37, and at the moment, the locking neck 36 releases the restriction on the on/off actuating mechanism 20, and then the on/off actuating mechanism 20 triggers the on/off valve 10 to change from a normal valve position to an abnormal valve position.

In the embodiment, the on/off actuating mechanism 20 comprises a cylinder 21, a push rod 22 is slidably mounted in the cylinder 21, an actuating piston 23 is connected with an upper end of the push rod 22, a compression spring 24 is arranged between the actuating piston 23 and the cylinder 21, a shifting fork 25 connected with the valve stem 11 is hinged in a middle portion of the push rod 22, a lower end of the push rod 22 extends out of the cylinder 21, and when moving linearly, the push rod 22 drives the shifting fork 25 to further change a valve position state of the on/off valve 10; and a lower end of the cylinder 21 is hinged with two oppositely arranged locking rockers 26, with reference to FIG. 1, when the on/off valve 10 is in a normal valve position, the two locking rockers 26 are in a closed state and a lower end of the push rod 22 is contacted with the two locking rockers 26, and free ends of the two locking rockers 26 are limited in a locking neck 36, so that the push rod 22 is restrained from moving by the two locking rockers 26. The free ends of the two locking rockers 26 are both provided with bearings 27 that roll against the locking neck 36 to reduce friction.

With reference to FIG. 1, when a medium pressure in the upstream pipeline 41 of the on/off valve is lower than a set pressure, that is, a pressure in the first chamber 33 of the pilot valve body 31 is lower than a set pressure, the load borne by the trigger rod 37 is lower than the critical load thereof at the moment, thus causing compression bar stability, when the trigger rod 37 is in a compression bar stability state, an axial pushing force of the trigger rod 37 may enable the ejector rod 35, the diaphragm 32 and the locking neck 36 to be in a first working position, the locking neck 36 is contacted with the bearing 27 at the moment, the two locking rockers 26 are clamped to prevent the rotation movement of the locking rockers 26, the two locking rockers 26 are in a closed state to bearing against the push rod 22, the push rod 22 may not move linearly in an axial direction, an elastic potential energy of a compression spring 24 cannot be released, and the on/off valve 10 is in a normal valve position.

When a medium pressure in the upstream pipeline 41 of the on/off valve is higher than a set pressure, that is, a pressure in the first chamber 33 of the pilot valve body 31 is higher than a set pressure, the load borne by the trigger rod 37 will exceed the critical load thereof at the moment, thus causing compression bar buckling and losing of load bearing capacity, after the trigger rod 37 loses the load bearing capacity due to unstable buckling, the pushing force acting on the ejector rod 35 may suddenly decrease, the medium pressure may push the diaphragm 32 to move to a second working position, during this process, the ejector rod 35 may drive the locking neck 36 integrally fixed with the ejector rod 35 to move until the locking neck 36 loses a restraining effect on the locking rockers 26, the push rod 22 pushes the locking rockers 26 to rotate under a pushing effect of the compression spring 24, the locking rockers 26 will no longer bearing against the push rod 22, the push rod 22 moves under the pushing effect of the compression spring 24, and the on/off valve 10 is changed from a normal valve position to an abnormal valve position through a shifting fork 25 (if the on/off valve is in a fully open position under a normal working condition, the on/off valve shall be automatically closed under an overpressure working condition, and a valve position becomes a fully closed position; and if the on/off valve is in the fully closed position under the normal working condition, the on/off valve shall be automatically opened under the overpressure working condition, and the valve position becomes the fully open position), thus realizing the automatic opening or closing of the valve under overpressure.

In addition, according to the Euler's law of the compression bar buckling, the critical load of the trigger rod 37 (a slender rod) can be changed by adjusting an elastic modulus and a slenderness ratio of the trigger rod 37, thereby changing the set pressure when the on/off valve 10 is operated.

In the present invention, the corrugated pipe, the diaphragm and the piston can be replaced with each other, with the same technical effect, and the basic principle lies in the corrugated pipe, the diaphragm and the piston can all generate two chambers through isolation, and can sense the pressure and move to a certain extent, which are all alternative forms of pressure sensing devices.

The descriptions above are only illustrative embodiments of the present invention, but are not intended to limit the scope of the present invention. Any equivalent changes and modifications made by those skilled in the art without departing from the concept and principle of the present invention shall all fall within the protection scope of the present invention.

The invention claimed is:

1. A valve system with an isolation device, comprising an on/off valve, an on/off actuating mechanism, a pilot trigger mechanism, a communicating pipe, and the isolation device, wherein:
   the on/off valve is mounted on a pipeline, wherein the on/off valve controls circulation of mediums in an upstream pipeline of the on/off valve and a downstream pipeline of the on/off valve;
   a valve stem of the on/off valve is connected with the on/off actuating mechanism;
   the upstream pipeline of the on/off valve is connected with the pilot trigger mechanism through the communicating pipe, the pilot trigger mechanism is connected with the on/off actuating mechanism;
   the isolation device includes a pressure sensing component and is arranged on the communicating pipe, the isolation device isolates the communicating pipe into an upstream portion and a downstream portion through the pressure sensing component, the pressure sensing component of the isolation device senses a medium pressure from the upstream pipeline and feeds back the pressure to the pilot trigger mechanism, thereby causing the pilot trigger mechanism to trigger the on/off actuating mechanism to move the on/off valve from a fully open position to a fully closed position or from the fully closed position to the fully open position, a non-viscous and incompressible fluid is filled between a downstream of the communicating pipe and the pilot trigger mechanism, the isolation device comprises a housing and a corrugated pipe, the pressure sensing component is the corrugated pipe, one side of the corrugated pipe is contacted with the medium of the upstream pipeline, the other side of the corrugated pipe is contacted with the fluid filled between the communicating pipe and the pilot trigger mechanism, a first opening in the housing provides access to the upstream portion of the communication pipe and the upstream pipeline, a second opening in the housing provides access to the downstream portion of the communication pipe and the pilot trigger mechanism, and the corrugated pipe is sealed around the first opening to create a space within the housing, which space expands towards the second opening when the medium pressure from the upstream pipeline increases, thus causing the non-viscous and incompressible fluid to flow through the second opening and the downstream portion of the communication pipe and toward the pilot trigger mechanism, thereby causing the pilot trigger mechanism to trigger the on/off actuating mechanism.

2. The valve system with an isolation device according to claim 1, wherein the on/off actuating mechanism comprises a cylinder, a push rod is slidably mounted in the cylinder, an actuating piston is connected with an upper end of the push rod, a compression spring is arranged between the actuating piston and the cylinder, a shifting fork connected with the valve stem is hinged in a middle portion of the push rod, a lower end of the push rod extends out of the cylinder, and when moving linearly, the push rod drives the shifting fork to further change a valve position state of the on/off valve; and a lower end of the cylinder is hinged with two oppositely arranged locking rockers, when the on/off valve is in a normal valve position, the two locking rockers are in a closed state and a lower end of the push rod is contacted with the two locking rockers, and free ends of the two locking rockers are limited in a locking neck.

3. The valve system with an isolation device according to claim 1, wherein the pilot trigger mechanism comprises a pilot valve body, the pilot valve body is divided into a first chamber and a second chamber by a diaphragm A, the first chamber is communicated with the downstream of the communicating pipe, an ejector rod connected with the diaphragm is slidably mounted in the pilot valve body, an upper end of the ejector rod extends out of the pilot valve body and is connected with the on/off actuating mechanism, and a lower end of the ejector rod extends out of the pilot valve body and is connected with a trigger rod.

4. The valve system with an isolation device according to claim 3, wherein a protective cover is arranged outside the trigger rod, and the trigger rod is detachably connected with the protective cover through a nut.

5. The valve system with an isolation device according to claim 3, wherein an upper end of the ejector rod extends out of the pilot valve body and is connected with a locking neck adapted for limiting the action of the on/off actuating mechanism.

6. The valve system with an isolation device according to claim 3, wherein a supporting plate is arranged between the ejector rod and the diaphragm A.

* * * * *